(12) United States Patent
Hellwig (10) Patent No.: US 7,675,433 B2
(45) Date of Patent: Mar. 9, 2010

(54) DEVICE AND METHOD FOR DETERMINING THE SENSOR POSITION OF SENSOR UNITS OF A DRIVER ASSISTANCE SYSTEM

(75) Inventor: Hans-Peter Hellwig, Regenstauf (DE)

(73) Assignee: Siemens Aktiengesellschaft, Munich (DE)

( * ) Notice: Subject to any disclaimer, the term of this patent is extended or adjusted under 35 U.S.C. 154(b) by 336 days.

(21) Appl. No.: 11/807,843

(22) Filed: May 30, 2007

(65) Prior Publication Data
US 2007/0279252 A1      Dec. 6, 2007

(30) Foreign Application Priority Data
May 30, 2006   (DE) ...................... 10 2006 025 174

(51) Int. Cl.
*B60Q 1/48*      (2006.01)
*G08G 1/14*      (2006.01)

(52) U.S. Cl. ..................... 340/932.2; 340/442; 340/505

(58) Field of Classification Search ............. 340/932.2, 340/442–448, 505, 506, 10.42, 933
See application file for complete search history.

(56) References Cited

U.S. PATENT DOCUMENTS

| | | | | |
|---|---|---|---|---|
| 5,565,842 A | * | 10/1996 | Tamori | 340/506 |
| 5,815,074 A | * | 9/1998 | Sasagawa et al. | 340/505 |
| 5,924,055 A | * | 7/1999 | Hattori | 340/447 |
| 6,043,738 A | * | 3/2000 | Stewart et al. | 340/447 |
| 6,278,363 B1 | * | 8/2001 | Bezek et al. | 340/442 |
| 6,417,766 B1 | * | 7/2002 | Starkey | 340/447 |
| 6,453,737 B2 | * | 9/2002 | Young et al. | 340/447 |
| 6,507,276 B1 | * | 1/2003 | Young et al. | 340/447 |
| 6,880,395 B2 | * | 4/2005 | Norimatsu et al. | 340/442 |
| 6,897,769 B2 | * | 5/2005 | Hayashi et al. | 340/442 |
| 7,202,777 B2 | * | 4/2007 | Tsuji et al. | 340/445 |
| 7,482,913 B2 | * | 1/2009 | Kusunoki et al. | 340/442 |

* cited by examiner

*Primary Examiner*—John A Tweel, Jr.
(74) *Attorney, Agent, or Firm*—Laurence A. Greenberg; Werner H. Stemer; Ralph E. Locher (57) ABSTRACT

A device and a method determine sensor positions of sensor units of a driver assistance system, especially a parking aid system of a vehicle. The sensor units each have a plurality of terminals of different identification positions. A data bus is connected for an exchange of data with a central control and evaluation unit in this case with one or more terminals of the sensor unit according to a specific connection scheme, which is different for each of the sensor units, in order to provide an identity code for the sensor position of a sensor unit in this way.

12 Claims, 5 Drawing Sheets

DEVICE AND METHOD FOR DETERMINING THE SENSOR POSITION OF SENSOR UNITS OF A DRIVER ASSISTANCE SYSTEM

CROSS-REFERENCE TO RELATED APPLICATION

This application claims the priority, under 35 U.S.C. §119, of German application DE 10 2006 025 174.1, filed May 30, 2006; the prior application is herewith incorporated by reference in its entirety.

BACKGROUND OF THE INVENTION

Field of the Invention

The present invention relates to a device and a method for determining the positions of sensor units of a driver assistance system of a vehicle, which in particular can be embodied in the form of a parking aid system or parking assistance system for a vehicle.

There are known parking assistance systems for vehicles that feature a plurality of sensor devices or sensor units. These parking assistance systems generally feature four sensor units, which are disposed in the front fender and detect the area in front of the vehicle. In addition a plurality of these types of sensor unit is also disposed in a rear fender of the vehicle and detects the area close behind the motor vehicle. The sensor units can feature ultrasound sensors in such cases. For the operation of parking assistance systems, especially for the assigned display and evaluation systems, it is important to be able to assign the individual sensor units to a precise installation location. Since the sensor units are usually of the same configuration and do not possess any unique identification features, it is difficult to assign a sensor to its position.

In conventional systems there is an installation specification, according to which diagnostic functions are used when installing sensor units in order to determine the assignment of a sensor to a specific position. This is expensive and as a rule involves many manual activities. A corresponding procedure must be undertaken when sensors are replaced in the workshop, if for example a sensor unit is defective.

Another variant for building sensor units into a motor vehicle involves equipping the sensor units with unique part numbers. This however again leads to increased expense since on the one hand the part numbers first have to be issued, and then as a rule, again in a manual process, the corresponding sensor units have to be built-in or installed at the intended positions.

Furthermore a separate data line is conventionally provided for each sensor unit to connect it to a central control and evaluation unit, with the installation position being predetermined by selection of the corresponding data line. The disadvantage of this however is that a plurality of data lines is present or long lengths of data line have to be installed.

SUMMARY OF THE INVENTION

It is accordingly an object of the invention to provide a device and a method for determining the sensor position of sensor units of a driver assistance system which overcome the above-mentioned disadvantages of the prior art devices and methods of this general type, which creates an option for installing sensor units for a driver assistance system with minimal procedural and technical effort and for determining their position for a correct operation of the driver assistance system.

In accordance with a first aspect of the invention a device for determining the sensor position of sensor units of a driver assistance system of a motor vehicle includes the following features in this case. The device has a plurality of sensor units, which can be disposed for monitoring purposes on the motor vehicle. Furthermore the device includes a data bus for connecting the individual sensor units to a central control and evaluation unit for an exchange of data. In this case each sensor unit features a plurality of distinguishable terminals which are in a specific order in relation to each other are have different identification positions, with one or more of the terminals being able to be connected to the data bus and the connection scheme or connection pattern of the data bus with the one or more connections provides an identity code for the sensor position of a sensor unit. In other words each sensor unit contains more terminals, especially for connection to the data bus, than is necessary to connect each sensor to the data bus in a manner characteristic for a specific sensor position. After activation, the sensor can then for example poll all available terminals, especially terminals for the data bus, and establish on which of the terminals data of the data bus will be received. Finally it detects from this the position at which it was installed. The connection scheme of the data bus with the terminal or terminals of a sensor device thus represents an identity code for a specific sensor position, so that the sensor unit finally, after establishing the connection scheme, can itself issue an address via which it is accessible to the central control and evaluation unit. This makes it possible for there not to be any steep learning curve produced for installation or replacement of sensor units of the driver assistance system or other measures, such as unique part numbers for the sensor units, to have to be provided.

A connection scheme or connection pattern of the data bus with a sensor unit can in this case depend on the number of terminals connected to the data bus. Furthermore the connection scheme can in addition to this or as an alternative to this depend on the identification position of the one or more terminals that are connected to the data bus. If for example the device for determining the sensor position includes four sensor units, with each sensor unit having three possible terminals with a fixed identification position for a possible connection to the data bus, then for the first sensor unit the data bus can be connected to the terminal of the first identification position, for the second sensor unit the data bus can be connected to the terminal the second identification position, for the third sensor unit the data bus can be connected to the terminal of the third identification position and finally the fourth sensor unit for characterizing its position for example, can be connected to the terminals of the first and second identification position. It is thus possible, based on a connection of the data bus to terminals with different identification position, or through a connection with a different number of terminals, to establish installation positions of sensors.

As already mentioned, a sensor unit can determine its sensor position through the connection scheme, and from this can derive a corresponding identity code or address, via which it can establish contact with the central control and evaluation unit. To store the determined address or identity code each sensor unit can have a non-volatile memory. The memory can in this case for example be embodied as an EEPROM: Electrically Erasable Programmable Read-Only Memory.

In accordance with an advantageous embodiment the data bus is embodied as a local interconnect network (LIN) bus or as a controller area network (CAN) bus. Another possibility however is also to embody the data bus as a Flexray bus. The embodiment of the data bus in one of the given options or further options can be undertaken according to the required data rate at which data must be exchanged over the data bus. In accordance with a further embodiment the sensor units include ultrasound sensors, radar sensors, infrared sensors, light detecting and ranging (LIDAR) sensors or other optical sensors such as camera sensors for image detection. Depending on the embodiment of the driver assistance system, for example in the form of a parking aid system or line-spot-detection-system, corresponding sensor units can be used, in which case an appropriate system from those mentioned above is to be selected.

In accordance with a further aspect of the invention a device for determining the sensor position of sensor units of a driver assistance system of a vehicle, especially a motor vehicle, has the now described features. The device has a number of sensor units, which for monitoring purposes are disposed on the motor vehicle and each feature a data input as well as a data output, and in an initial state, the data input is activated and the data output is deactivated. Therefore the sensor units can for example be delivered preconfigured in which data output is deactivated. To put it another way, after the installation of a sensor unit, it can receive data via the activating data input but not output any data however or forward data that has been received at the data input. Furthermore the device for determining the sensor position features a vehicle bus or data bus that connects the respective sensor units to each other in series so that a data output of one sensor unit is connected to the data input of the following sensor unit. Only the data output of the last sensor unit of the series can remain free or no further data line must be routed out of this unit. Furthermore the device for determining the sensor position has a central control and evaluation unit, which is connected to the individual sensor units for an exchange of data via the data bus. In this case the central control and evaluation unit is advantageously connected via a data line of the data bus to the data input of the first sensor unit of the sensor units connected in series with each other. The central control and evaluation unit in this case is configured so that it allocates to a sensor unit a new, individual identity code, whereby the sensor unit activates its data output for a data connection to a following sensor unit in the series. To put it another way, if the sensor units described above have been connected to each other in series over the data bus with a deactivated data output, with the central control and evaluation unit being connected via a data line to the data input of the first sensor unit in the series, because of the deactivated data output of the first sensor unit in the series, initially a data connection only exists between the control and evaluation unit and the first sensor unit in the series. Consequently learning or identification can only be undertaken in relation to the first sensor unit in the series.

The central control and evaluation unit thus initially learns of the first sensor unit and allocates to it a first new, individual identity code. In this context the first sensor unit activates a data output for a data connection to the next sensor unit in the series. Through this activation of the data output of the first sensor unit a block on data forwarding through the first sensor unit is to some extent lifted, and a data connection from the central control and evaluation unit to the second sensor unit of the series now exists. Finally in a next step the second sensor unit of the central control and evaluation unit can now be allocated a new, individual identity code, with the second sensor unit also finally activating its data output for a data connection to the next sensor unit. In this way the sensor units can then be identified in a simple manner without the effort of diagnostic methods or identification of sensor units by unique part numbers. It should again be stated that after allocation of a new, individual identity code to the last sensor unit in the series the last sensor unit does not necessarily have to activate its data output, since no data connection would have to be established to a following sensor unit.

Because of the fact that the installation site or installation position in the vehicle is determined by the position in the data bus, the central control and evaluation unit knows, on the basis of the chronology of the issuing of individual identity codes, which sensor unit with which identity code is disposed at a specific position on the data bus and thus at a specific position on the vehicle. It can thus be guaranteed that the driver assistance system, configured as a parking aid system for example, can receive data from the correctly assigned sensor units in order to function correctly. In addition the central control and evaluation unit can create or select the relevant identity code in such a manner that the installation position of the corresponding sensor unit is contained in this code, so that a sensor unit, after receiving its identity code, knows its installation location.

In accordance with an advantageous embodiment of the invention a sensor unit is assigned a controllable switch for activating or deactivating a respective data output. In this case either only the first sensor units, except for the last sensor unit in the series, can have this type of controllable switch, or all sensor units can have such a switch. The switch serves, as already mentioned, in an initial state (for example after the installation of a sensor unit) to block the passage of data through the sensor unit and only to enable the passage of data after receipt of the individual identity code.

To actuate the controllable switch a sensor unit can have its own sensor control unit by which the relevant controllable switch is able to be controlled. Like the central control and evaluation unit a relevant sensor control unit can include a microprocessor.

In accordance with a further advantageous embodiment of the invention each sensor unit has a memory, especially a non-volatile memory (e.g. an EEPROM: Electrically Erasable Programmable Read-Only Memory) for storing the individual identity code allocated. The memory can furthermore be configured so as to not only store the identity code but also the switching status of the controllable switch of a sensor unit.

In accordance with a further advantageous embodiment the data bus is embodied as a LIN (Local Interconnect Network) bus or as a CAN (Controller Area Network) bus. Another possibility however is also to embody the data bus as a Flexray bus. The embodiment of the data bus in one of the given options or further options can be undertaken according to the required data rate at which data must be exchanged over the data bus. In accordance with a further embodiment the sensor units include ultrasound sensors, radar sensors, infrared sensors, LIDAR (Light Detecting and Ranging) sensors or other optical sensors such as camera sensors for image detection. Depending on the embodiment of the driver assistance system, for example in the form of a parking aid system or line-spot-detection-system, corresponding sensor units can be used, in which case an appropriate system from those mentioned above is to be selected.

Up to this point it has been described how, especially after the installation of sensor units, these can be allocated individual identity codes in order to determine their position. It is however also conceivable that for example in a workshop, after replacement of one or more sensor units or the central control and evaluation unit, an initialization or a reset of the sensor units is advantageously to be executed. In this case the central control and evaluation unit can be configured so that it sends a reset signal over the data bus to the sensor units, through which the sensor units are made to deactivate the relevant data output and/or to discard the identity code. If the switching status of the controllable switch is also stored in a sensor unit, this can also be discarded. After the output of the reset signal or after execution of corresponding reset actions in response to the signal in the sensor units a new learning or identification of the respective sensor units can start again from the beginning, as has been described above.

In accordance with a further aspect of the invention a method for determining the sensor position of sensor units of a driver assistance system of a motor vehicle is created. In this case a plurality of sensor units is first provided for monitoring purposes on the motor vehicle, each of which features a plurality of terminals of different identification positions. Furthermore a data bus for an exchange of data between the individual sensor units and a central control and evaluation unit is provided. Finally the data bus is connected in such a way to one or more respective terminals of the sensor unit in accordance with a particular connection scheme which is different for each of the sensor units, in order thereby to provide an identity code for the sensor position of a sensor unit. To put it another way, by providing a connection scheme which is characteristic for a particular sensor position of the data bus with a respective sensor unit at the particular sensor position a simple option for identifying the installation position for a sensor unit is created, without having to undertake complex learning process during installation or replacement of a sensor unit. Therefore the procedural or technical effort is minimized during installation or replacement of a sensor unit.

In accordance with an advantageous embodiment the scheme for connecting the data bus to the respective terminals of the sensor units depends on the number of terminals connected to the data bus and/or the identification position of the one or more terminals that are connected to the data bus.

As already mentioned it is possible for a sensor unit, as a result of the characteristic connection scheme for a particular installation, to determine for itself the position at which it has been installed. The sensor unit can thus assign itself an address or identity code via which it can communicate with the central control and evaluation unit. In accordance with an advantageous embodiment this address or identity code can be stored in a non-volatile memory device of each sensor unit.

In accordance with a further aspect of the invention a method for determining the sensor position of sensor units of a driver assistance system of a vehicle is created. In this embodiment the sensor units are initially connected in series to one another and to a central control and evaluation unit for an exchange of data, with the passage of data through a sensor unit being blocked in an initial state. Thereafter a sensor unit is identified to the central control and evaluation unit by allocation of a new individual identity code for this sensor unit. Finally the blocking of the passage of data through a sensor unit just identified is canceled in order to create a data connection to the next sensor unit, and in order also to identify the next sensor unit in the series. By repeated application of the steps of identifying a sensor unit or of canceling the blocking of the passage of data through an identified sensor unit, all sensor units which are connected in series with each other can be identified in a simple manner or can be determined on the basis of the chronology of the identification of their sensor position.

In accordance with an embodiment of the method the last sensor unit in the series is merely allocated a new individual identity code, without the blocking of the passage of data being canceled. Since the last sensor unit in the series is not followed by any further sensor unit, the step of canceling the block on the passage of data can be saved for the last sensor unit.

In accordance with a further embodiment of the invention the newly allocated identity code is stored in a memory device.

For initialization of all sensor units in the "workshop situation", in which for example one of the sensor units or another component of the driver assistance system has been replaced, the central control and evaluation unit can transmit a reset signal to the sensor unit, through which the sensor units are made to deactivate the respective data output and/or to discard the identity code. After execution of this type of initialization or this type of reset a new learning or identification of the sensor units can be started, as explained above.

Further possible embodiments of the method for determining the sensor position emerge from the description of the device for determining the sensor position in accordance with the first aspect of the invention.

Other features which are considered as characteristic for the invention are set forth in the appended claims.

Although the invention is illustrated and described herein as embodied in a device and a method for determining the sensor position of sensor units of a driver assistance system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures of the drawing, unless stated otherwise, the same reference symbols identify functionally identical components. Referring now to the figures of the drawing in detail and first, particularly, to FIG. 1 thereof, there is shown a schematic diagram of a vehicle FZ, here a motor vehicle, with a driver assistance system in the form of a parking assistance system or parking aid system containing a control unit EPH as well as sensor units PS1 through PS4. Furthermore a device for determining the sensor position of the sensor units PS1 through PS4 of the parking aid system is shown, which is to be explained below first in respect of its structure and then in respect of its function. The device for determining the sensor positions to which a central control and evaluation unit STE (abbreviated below to central evaluation unit) as well as the sensor units PS1 through PS4 and a data bus system containing the data lines BL1 through BL4 are assigned, can in this case be embodied as part of a driver assistance system, here of the parking aid system with the central control unit EPH.

So that the parking aid system (in the following represented by the control unit EPH) can monitor the external environment of the motor vehicle FZ, four parking aid sensor units (abbreviated to sensor units below) PS1 through PS4 are provided, with the sensor units PS1 and PS2 being provided in a non-illustrated front fender and the two sensor units PS3 and PS4 in a rear fender of the vehicle FZ. Although in FIG. 1, for reasons of clarity, only two sensor units are shown per fender, it is naturally conceivable to provide any sensible number of sensor units depending on the purpose, such as four or six sensor units per fender for example (or six sensor units on the front fender and four sensor units on the rear fender). As well as the option shown in FIG. 1 of providing the central evaluation unit STE for all sensor units, it is further possible for a central evaluation unit including a separate data bus system to be provided for the sensor units of the front fender and for a further central evaluation unit including a separate data bus system to be provided for the sensor units of the rear fender. The two evaluation units can then in their turn be connected to control unit EPH.

Figure 1:
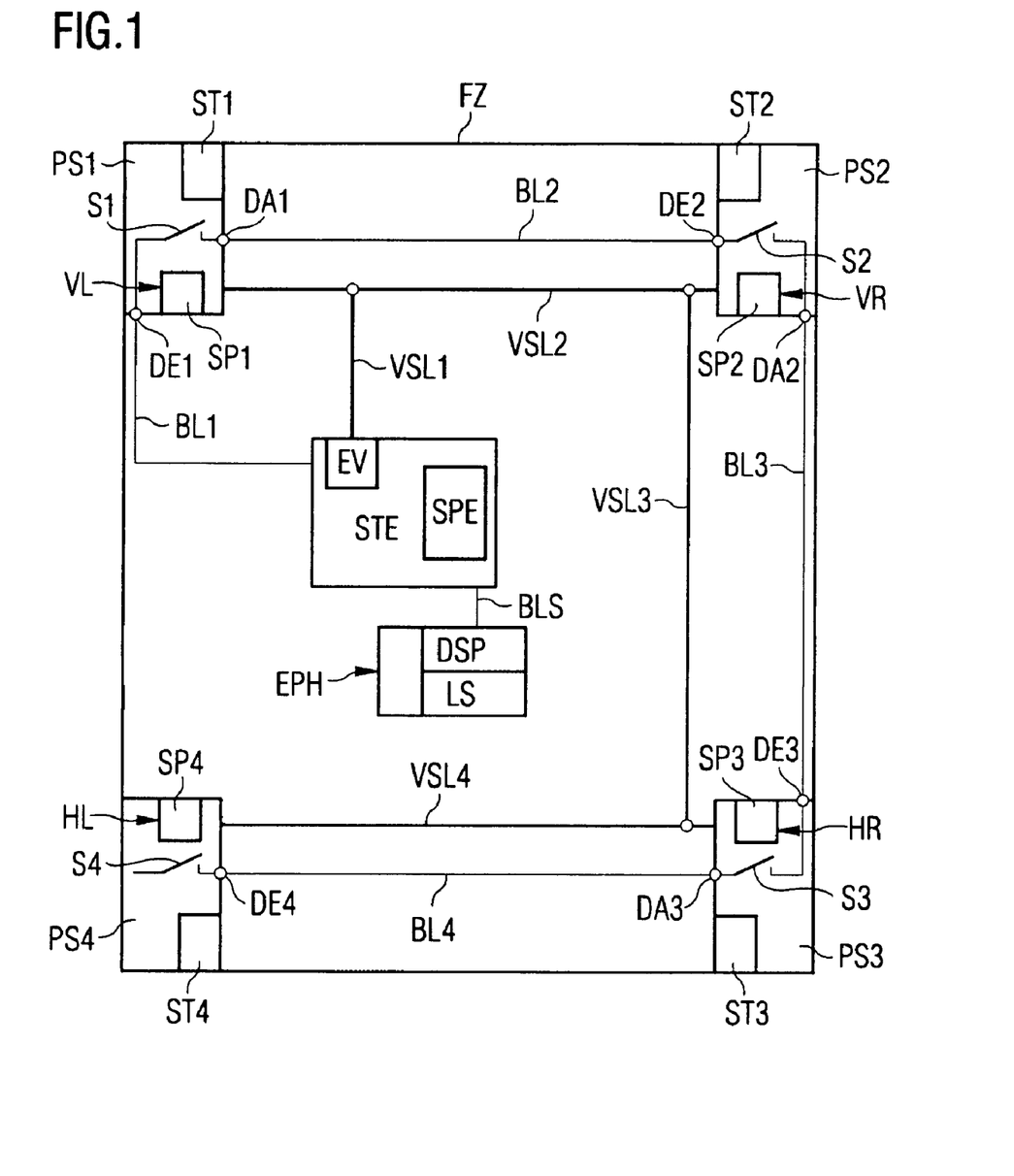
FIG. 1 is a schematic diagram of a motor vehicle with a device for determining a sensor position in accordance with a first embodiment of the invention.

The sensor units can be ultrasound sensors in such cases, which are configured to detect objects in the external environment of the motor vehicle FZ. A respective ultrasound sensor includes in this case a transmitter and a receiver for ultrasound signals and in operation will emit or receive ultrasound signals cyclically, for example within of a cycle of preferably 30 ms, in order to detect objects or obstacles or determine the distance from and to objects and obstacles based on the delay time of reflected signals.

It should be pointed out at this juncture that, in accordance with the present embodiment, parts and components which are assigned to the front left sensor position VL are provided with a reference symbol number with a suffix "1", parts and components which are assigned to the front right sensor position VR are provided with a reference symbol number with a suffix "2", parts and components which are assigned to the rear right sensor position HR are provided with a reference symbol number with a suffix "3" and parts and components which are assigned to the rear left sensor position HL are provided with a reference symbol number with a suffix "4". Thus for example the sensor unit PS1 identifies the sensor unit disposed on the front left, the sensor unit PS2 the sensor unit disposed on the front right etc.

To determine the sensor positions the sensor units PS1, PS2, PS3, PS4 are connected to each other via a data bus system or field bus system (containing the lines BL1, BL2, BL3, BL4) in series and to the central evaluation unit STE (as the core of a device for determining the sensor position of the sensor units PS1-PS4) for signaling, as depicted in FIG. 1. In more precise terms the individual sensors PS1 through PS4 are connected to each other or to the central evaluation unit STE as follows: the central evaluation unit STE is connected via the bus line BL1 to a data input DE1 of the first sensor unit PS1. The sensor unit PS1 is connected to the sensor unit PS2 in such a manner that a bus line BL2 is provided from a data output DA1 of the sensor unit PS1 to a data input DE2 of the second sensor unit PS2. Correspondingly the second sensor unit PS2 is connected to the third sensor unit PS3 in such a manner that a bus line BL3 is provided from a data output DA2 of the sensor unit PS2 to a data input DE3 of the sensor unit PS3. Finally the third sensor unit PS3 is connected to the fourth sensor unit PS4 in such a manner that a bus line BL4 is routed from a data output DA3 of the third sensor unit PS3 to a data input DE4 of the fourth sensor unit PS4. As described in more detail further below, in an initial state, for example in an pre-configured state, the sensor units are configured in such as way that the respective data inputs are activated (data can be received), and the respective data outputs are deactivated (no data can be forwarded).

As can further be seen from FIG. 1, the motor vehicle FZ or the parking aid system with the device for determining the sensor position preferably includes an additional power supply line system, with the sensor unit PS1 being connected via a power supply line VSL1 to an energy supply source EV. The energy supply source EV can for example be embodied as an automobile battery with a 12-volt supply, which forms a part of the central evaluation unit STE or can be connected to this unit. Furthermore the other sensors PS2, PS3, PS4 are connected via corresponding power supply lines VSL2, VSL3 and VSL4 to the energy supply source EV.

As is also shown in FIG. 1, the sensor unit PS1 front left VL preferably includes a controllable switch S1 that is configured to activate or to deactivate the data output DA1 of the sensor unit PS1. In other words the switch S1 serves to block the passage of data through the sensor unit PS1 (in an opened state of switch S1, as it is shown in FIG. 1) or to allow the passage of data (in a closed state of switch S1). The remaining sensor units PS2, PS3, PS4 also have corresponding switches S2, S3, S4. As will also be noted below, it is not absolutely necessary to equip the last sensor unit PS4 with one of these switches, since no passage of data to a further sensor unit must be blocked or activated. However for reasons of simple installation four identical sensor units can be used. As also for sensor unit PS1, in FIG. 1 the switches S2, S3 and S4 of the further sensor units PS2, PS3 and PS4 are shown in an initial state (for example directly after being installed in the motor vehicle FZ), with the respective switches being in an opened state, in which the respective data outputs DA2, DA3, DA4 are deactivated.

The control of the respective switches S1, S2, S3 and S4 in these cases are handled by respective sensor control units ST1, ST2, ST3 and ST4. The option of deactivation or explicit activation of the data outputs of the respective sensor unit enables the central evaluation unit STE via the motor vehicle or the data bus to newly learn the individual sensor units for example, when the parking aid system or of the entire motor vehicle are initialized for example or during a new start of the motor vehicle, in such a manner that each sensor unit PS1, PS2, PS3, PS4 is assigned an exact defined sensor position VL, VR, HR, HL. This type of learning or identification of sensor units will be explained in greater detail below using FIG. 2 as an aid to explanation. As already mentioned the sensor units PS1 through PS4 or the assigned switches S1 through S4 are in an initial state, in which, as shown in FIG. 1, the respective switches S1 through S4 are opened and thus the respective data outputs are deactivated. In other words in this initial state there is merely a data connection between the central evaluation unit STE and the first sensor unit PS1.

Figure 2:
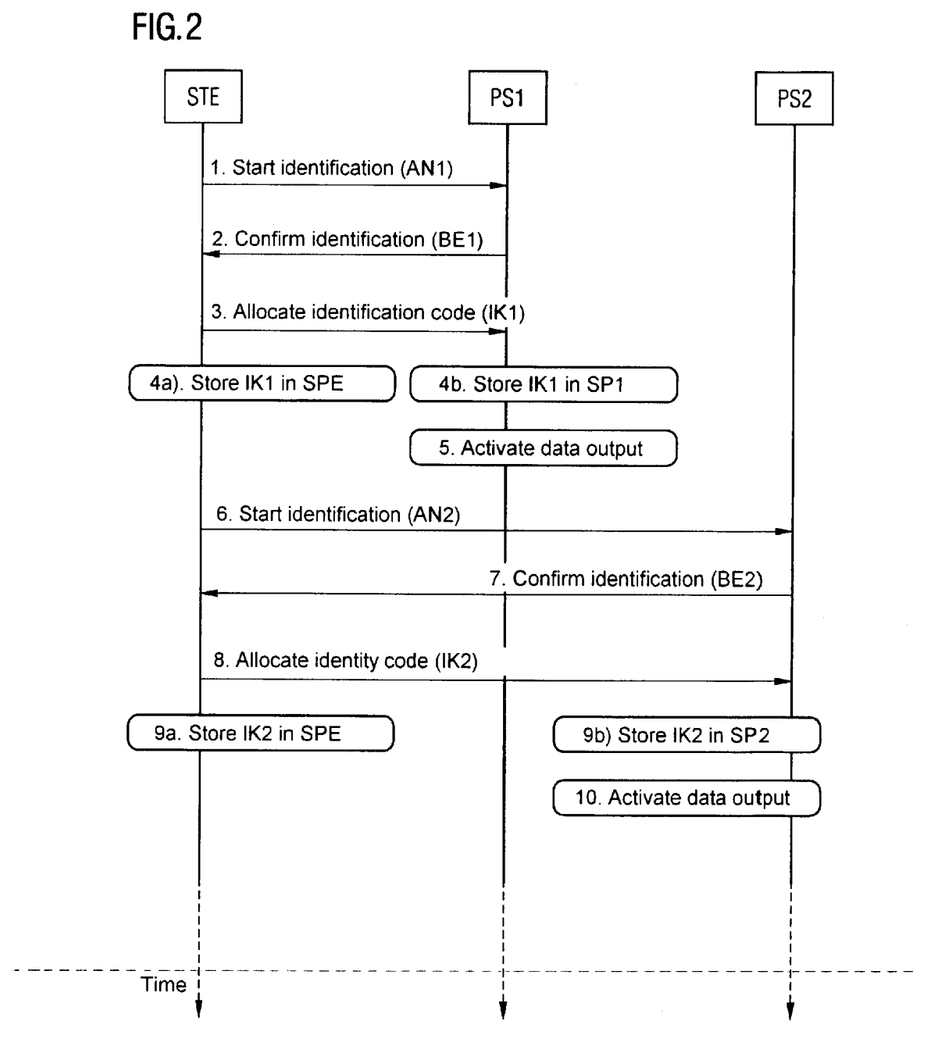
FIG. 2 is a schematic diagram of an execution sequence for learning or identifying sensor units within the framework of the device for determining the sensor position according to FIG. 1.

As shown in FIG. 2, the central evaluation unit STE, in a first step at the beginning of the learning process or the identification process, sends a first learning signal or identification signal AN1 to the first sensor unit PS1. If the first sensor unit PS1 is ready for the learning or identification process, it sends a confirmation message BE1 back to the central evaluation unit STE in a second step. The central evaluation unit STE now recognizes that the first sensor unit PS1 is ready for the identification process and transmits in a third step in a first identification message IK1 a new individual identity code, for example the identity code VL, which designates the front left sensor position. The received identity code (here VL) can then be stored in a fourth step in a first memory device SP1 of the first sensor unit PS1. Furthermore, also in the fourth step, the information can be stored in a memory device SPE of the central evaluation unit STE that the first sensor unit PS1 has been allocated the individual identity code VL.

After the first sensor unit PS1 has now been learnt and has received its identity code, the second sensor unit PS2 should also be learnt. To this end the control unit ST1, in a fifth step, now sets the controllable switch S1 to a closed state in order to activate the data output DA1 of the first sensor unit PS1. In other words, closing the switch S1 allows a passage of data from the central activation unit STE to the second sensor unit PS2.

In a sixth step the central evaluation unit STE now transmits a second learning signal or identification signal AN2 over the data bus. Since the first sensor unit PS1 has already had an identity code allocated to it, it does not reply to the second learning signal, but lets this signal pass through the data output DA1 over the bus line BL2 to the second sensor unit PS2. If the second sensor unit PS2 is ready for the learning process, it sends in a seventh step a confirmation signal or a confirmation message BE2 back to the central evaluation unit STE. This now recognizes that the second sensor unit is ready to learn and sends this in an eighth step an identification message IK2 with an individual identity code for the second sensor unit, for example the identity code VR, which designates the front right sensor position. This received individual identity code is finally stored in a ninth step in a second memory device SP2 of the second sensor unit PS2 and it is advantageously also noted in the memory device SPE of the central evaluation unit that the second sensor unit has been allocated the identity code VR. Furthermore the control device ST2, in a tenth step, now causes the switch S2 to move to a closed state in order to allow the passage of data through the second sensor unit PS2 or to activate the data output DA2.

Since the first two sensor units PS1 and PS2 are now learnt and their outputs are switched to free, the third sensor unit PS3 as well as the fourth sensor unit PS4 can now be learnt in accordance with the description of learning first two sensors. It is merely pointed out that after learning or identification the fourth sensor unit PS4 the control unit ST4 does not necessarily have to put switch S4 into a closed state since the sensor unit PS4 is the last sensor unit in the series.

Thus, through the device or the method already described for learning the individual sensor units, a simple option can be created which can be deployed without any major modifications to existing components and which guarantees a determination of the sensor position of sensors of the motor vehicle FZ or of the parking aid system in a simple manner. By embodying the respective memory devices SP1, SP2, SP3, SP4 or SPE as non-volatile memory devices (e.g. as EEPROM) it is thus not necessary, on each new start of the motor vehicle to execute the learning process for the sensors. It is however possible to execute such a learning process each time that the vehicle is started up.

Figure 3:
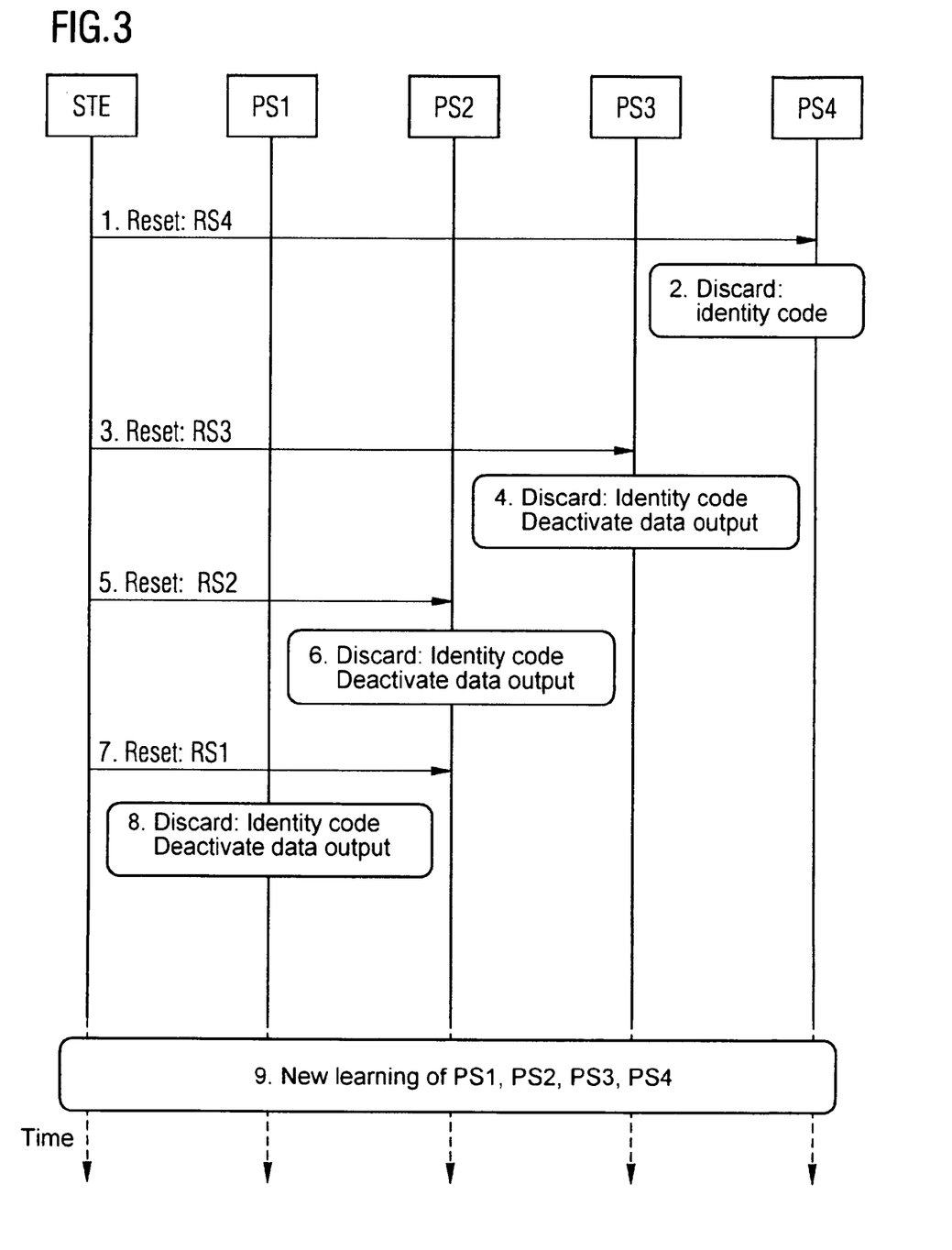
FIG. 3 is a schematic diagram of the execution sequence for execution of a reset of the sensor units by the central evaluation unit.

Since it can occur that individual sensor units or also the central evaluation unit can be defective and have to be replaced, it is worthwhile executing a new learning or identification of the sensor units after a corresponding repair or maintenance process. To this end, as is shown in FIG. 3, the central evaluation unit STE can transmit over the data bus or output lines BL1, BL2, BL3, BL4 a respective reset signal RS4, RS3, RS2, RS1 to all sensor units PS4, PS2, PS3, PS1 (for example in the timing scheme shown in FIG. 3) which has the effect that all sensor units delete or discard the previously allocated identification code in their memory device SP1, SP2, SP3 and SP4. Furthermore the relevant control units ST1 through ST4 of the sensor units PS1 through PS4 are instructed to put switches S1 through S4 into an opened state in order to deactivate the respective data outputs DA1 through DA4. It is pointed out that no deactivation is required in relation to data output DA4, as is shown in FIG. 3, since in the embodiment no data line is provided to a further sensor unit at this data output.

Thus, through a reset signal just described the sensor units PS1 through PS4 can be put into an initial state, in which a new process for learning the sensor units can be executed, as has been described above in relation to FIGS. 1 and 2.

As well as the case just described, in which the respective reset commands arrive at the individual sensor units directly over an uninterrupted data bus, it is however conceivable that for example one or more of the sensor units connected in series will be in an initial state after having been replaced, in which their data output is deactivated. A reset as described for FIG. 3 would not then be possible. In such a case, it is now assumed according to an advantageous embodiment of a sensor unit, that the control unit assigned to a sensor unit (cf. ST1, ST2, ST3, ST4 for sensor units PS1, PS2, PS3, PS4) has its own intelligence. A reset (for a sensor unit arrangement as shown in FIG. 1) can then be undertaken as follows. The central evaluation unit sends a reset command to the first sensor unit, of which it is assumed here that its data output is activated. Its control unit (cf. ST1) recognizes the reset command, forwards the reset command to the second sensor unit and executes the reset actions specified above itself (erasing memory SP1, opening switch S1). It is now assumed that the second sensor unit has been previously replaced during maintenance, so that this second sensor unit is in an initial state (activated data input, deactivated data output). Via the data input the control unit (cf. ST2) of the second sensor unit receives the reset command, can (but does not have to) initialize the memory of the second sensor unit, and briefly activates the data output of the second sensor unit (for example by closing switch S2), in order to transmit the reset command to the further sensor unit in the series. After the reset command has been sent the data output is deactivated again. The further sensor units can then be reset or initialized in accordance with the resetting of the first two sensor units just described.

Likewise according to this embodiment of resetting the sensor units into an initial state, a new learning of the sensor units can be undertaken, as has been described above in relation to FIGS. 1 and 2.

Once all sensor units PS1 through PS4 have been correctly learnt or identified, the parking aid system EPH, which is connected via a data line to the evaluation device STE can start to operate, by receiving sensor signals from the sensor units PS1 through PS4 (and possibly other sensors or sensor units) and emitting corresponding acoustic or optical signals or instructions via a loudspeaker LS and/or a display as an output unit(s) of the parking aid system.

Figure 4:
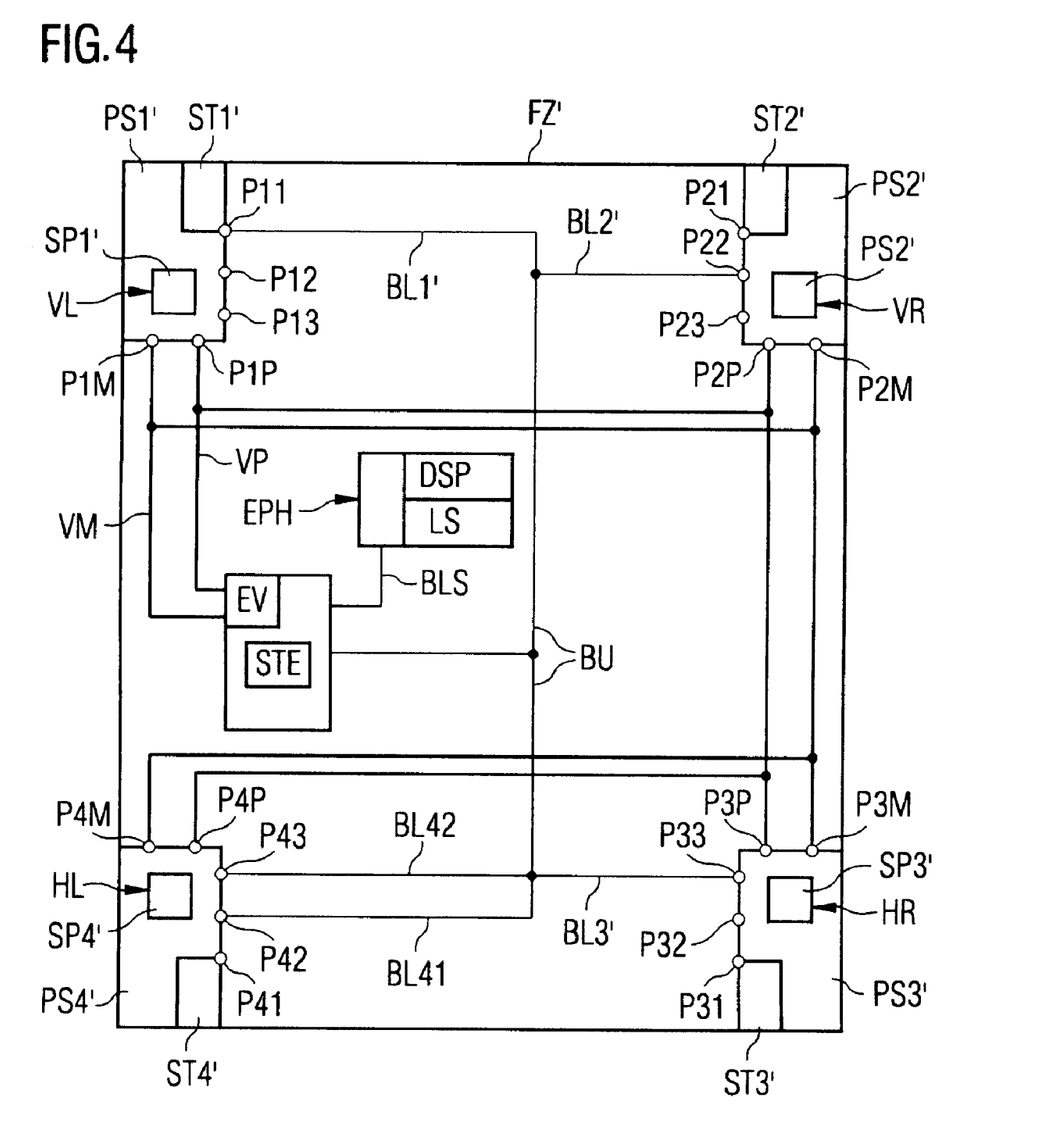
FIG. 4 is a schematic diagram of the motor vehicle with the device for determining the sensor position in accordance with a second embodiment of the invention.

The reader is now referred to FIG. 4 which illustrates a schematic view of a motor vehicle FZ' with a driver assistance system in the form of a parking assistance system or parking aid system in accordance with a second embodiment. In this case the parking aid system, like the parking aid system shown in FIG. 1, includes a control unit EPH as well as sensor units PS1' through PS4'. For a more detailed explanation of the parking aid system the reader is referred to the explanation for FIG. 1.

FIG. 4 also shows a device for determining the sensor position of the sensor units PS1' through PS4' with regard to their installation in the vehicle FZ'. The device for determining the sensor position, to which the sensor units PS1' through PS4' with corresponding terminals or pins and a data bus system BU containing the data lines BL1' through BL4' for connection to a central control and evaluation unit STE' (abbreviated to central evaluation unit below), can in this case be embodied as part of a driver assistance system, here of the parking aid system with the central control unit EPH.

So that the parking aid system (represented below by the control unit EPH) can monitor the external environment of the motor vehicle FZ', the four parking assistance sensor units (shortened to sensor units below) PS1' through PS4' are provided, with sensor units PS1' and PS2' being provided in a front fender (not shown) and the two sensor units PS3' and PS4' being provided in a rear fender of the vehicle FZ'. Although in FIG. 4, for reasons of clarity, only two sensor units are shown per fender, it is naturally conceivable to provide any sensible number of sensor units depending on the purpose, such as four or six sensor units per fender for example (or six sensor units on the front fender and four sensor units on the rear fender). As well as the option shown in FIG. 4 of providing a central evaluation unit STE for all sensor units, it is further possible for a central evaluation unit including a separate data bus system to be provided for the sensor units of the front fender and for a further central evaluation unit including a separate data bus system to be provided for the sensor units of the rear fender. The two evaluation units can then in their turn be connected to control unit EPH. As already explained in relation to FIG. 1, the sensor units can feature ultrasound sensors which are configured to detect objects in the external environment of the motor vehicle FZ'.

The special feature of the motor vehicle FZ' of the second embodiment lies in the fact that the relevant sensor unit PS1' through PS4' feature a plurality of terminals or pins, with, in particular as regards the terminals, more terminals than are actually required are provided for a connection to the data bus BU. Initially however the sensor unit PS1' has a ground terminal P1M and a positive terminal P1P, the second sensor unit PS2' has a ground terminal P2M and a positive terminal P2P, the third sensor unit PS3' has a ground terminal P3M and a positive terminal P3P, and the fourth sensor unit PS4' has a ground terminal P4M and a positive terminal P4P. In this case the respective ground terminals of the sensor unit are connected to the ground line VM and the respective positive terminals are connected to the positive line VP for energy supply. The ground line VM and the positive line VP are part of a power supply line system here that is connected to an energy supply source EV. The energy supply source EV can for example be embodied here as an automobile battery with a 12-volt supply, which forms a part of the central evaluation unit STE' or can be connected to this unit.

As well as the two terminals for the energy supply, each of the sensor units PS1' through PS4' has three further distinguishable or identifiable terminals for connection to the data bus BU. Thus sensor unit PS1' has the input terminals P11, P12 and P13 with different identification numbers or identification positions. Accordingly the sensor unit PS2' has the input terminals P21, P22 and P23, the sensor unit PS3' has the input terminals P31, P32 and P33 and finally the sensor unit PS4' has the input terminals P41, P42 and P43. As is further to be seen in FIG. 4, the data bus BU is connected to a sensor unit at a specific position or installation position in a characteristic manner for this unit. In this case the first bus line BL1' of the data bus BU is connected to the first bus terminal P11 whereas the second sensor unit PS2' is connected via the second bus line BL2' to the second bus terminal P22 (or to the bus terminal with the second identification position). The third sensor unit PS3' is finally connected via the bus line BL3' to the third bus terminal P33 (or the bus terminal at the third identification position). Therefore, the sensor position can be identified for the first three sensor units PS1' through PS3' from the bus terminal to which the respective bus line is applied.

Since in accordance with the second embodiment of the motor vehicle FZ', each sensor unit has three possible bus terminals, but there are four sensor units to be identified, it is now possible to identify the fourth sensor unit or its sensor position by providing more than one bus line to more than one bus terminal. In the example of FIG. 4 a fourth bus line BL41 with a second bus terminal P42 of the sensor unit PS4' is provided for this purpose and a fifth bus line BL42 is connected to a third bus terminal P43. It would naturally also have been possible to determine the sensor position for the fourth sensor unit PS4' using another terminal connection scheme, for example in which the input terminals P41 and P43 but also all bus terminals P41, P42 and P43 are connected via the respective bus line to the data bus BU. Therefore, in summary, a sensor position or an installation position for a sensor can be determined by connection of the data bus to a specific bus terminal (a bus terminal with a specific identification position), or also through the number of the bus terminals of a respective sensor unit connected to the data bus. Finally permutation options may also be produced for multiple connection of the data bus to a number of bus terminals.

The number of additional terminals or possible input terminals is preferably to be adapted to the number of identity codes needed for them.

In the practical implementation of the schematic diagram shown in FIG. 4 it is possible to provide parts of the data bus BU or the respective bus lines assigned to the sensor units in a wiring loom, with the appropriate (wiring loom-side) plugs being provided at the relevant installation positions or sensor positions for the sensor units, which are wired to the respective bus lines from the wiring loom in a characteristic manner. For the installation position of a sensor unit at the front left for example the bus line BL1' is connected to that terminal of the plug for the front left installation position, which finally, when this plug is correctly plugged into a corresponding sensor unit (here the sensor unit PS1') effects a connection with the (first) bus terminal P11. Further connectors can be wired accordingly for the other installation positions front right, rear right, rear left shown in FIG. 4.

If a sensor unit of the sensor units PS1' through PS4' shown in FIG. 4 is defective and has to be replaced, the wiring loom-side plug merely has to be detached from the sensor unit to be replaced and correctly connected to a new sensor unit. In this case the data bus BU is then connected automatically according to the characteristic connection scheme to the new sensor unit, so that this can determine its installation position on the basis of this connection scheme, as will be shown below.

Figure 5:
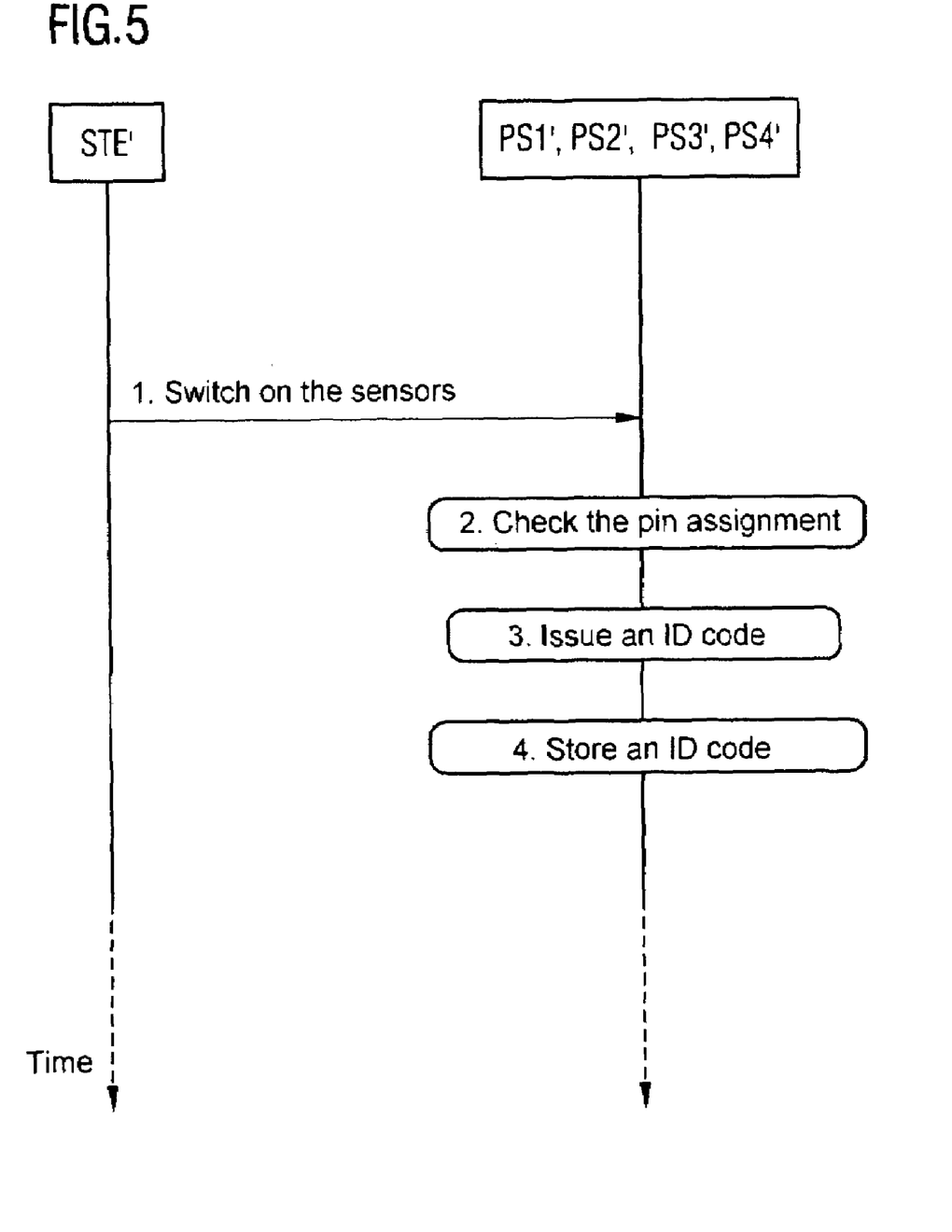
FIG. 5 is a schematic diagram of the execution sequence for determining the sensor position of sensor units of the motor vehicle of FIG. 4.

The reader is referred here to FIG. 5 that shows a schematic diagram of the execution sequence for determining the sensor position of sensor units which are installed in a motor vehicle of FIG. 4. It is assumed in this case that the sensor units PS1', PS2', PS3', PS4' are in a non-activated state (for example in a stationary or parked state of the vehicle FZ'), in which they are not being supplied with energy or current by the energy supply source EV. In a first step therefore the sensor units PS1', PS2', PS3', PS4' are switched on or at the behest of the control device STE' are supplied with energy from the energy supply source EV. After they have been switched on, the sensor units PS1' through PS4' then inquire in a second step as to which of their bus terminals or pins has a connection to the data bus BU or at which of the terminals bus data is present.

The sensor unit PS1' detects in this case at its first bus terminal P11 whether bus data is present, while the second sensor unit PS2' detects that bus data is present at its second bus terminal P22 etc. Based on the connection scheme of the respective input terminals with the data bus, each sensor unit thus detects autonomously the position at which it is installed. Thus each sensor unit, in accordance with a third step, can assign to itself an address or identity code, via which it will be addressed by the central evaluation unit STE'.

In accordance with a fourth step the determined address or identity code can be stored in the respective memory device SP1', SP2', SP3', SP4' of the sensor units. Thus the first sensor unit PS1' can store the identity code "VL" for the front left installation position, the second sensor unit PS2' the identity code "VR" for the front right installation position, the third sensor unit PS3' the identity code "HR" for the rear right installation position, and the fourth sensor unit PS4' the identity code "HL" for the rear left installation position. Both the determination of the installation position and also its storage can be undertaken by a respective sensor device-side control device ST1', ST2', ST3' or ST4'.

It is conceivable for an assignment table to be stored in the memory device for determining the identity code, which specifies an assignment between a connection scheme of a sensor unit with the data bus (and thus the installation position of the sensor position) and specifies a corresponding identity code. After determining the connection scheme with the data bus, a respective sensor unit can then deduce its installation position on the basis of the assignment table. The identity code determined in this way can then be used for communication with the central evaluation unit STE'.

In summary it can thus be established that no particular precautions need to be taken when installing or replacing a sensor unit, but merely a new sensor unit provided in place of the sensor unit to be replaced and connected accordingly to a plug wired specifically for the installation position. Since in addition no expensive learning process for newly installed sensor is required, the outlay in time and money for installing a new sensor unit or replacing an existing unit is minimized.

The invention claimed is:

1. A device for determining a sensor position of a sensor unit of a driver assistance system of a motor vehicle, the device comprising:
   a plurality of sensor units disposed for monitoring purposes on the motor vehicle and each having a data input and a data output, with said data input being activated and said data output deactivated in an initial state;
   a data bus connecting said sensor units to each other in series so that said data output of one of said sensor units is connected to said data input of a following one of said sensor units; and
   a central control and evaluation unit connected for an exchange of data over said data bus to individual ones of said sensor units, said central control and evaluation unit allocating a respective sensor unit a new individual identity code and said respective sensor unit activating said data output for a data connection to a next one of said sensor units being a next sensor unit.

2. The device according to claim 1, wherein each of said sensor units has a controllable switch for activating or deactivating said data output.

3. The device according to claim 2, wherein each of said sensor units has a sensor control unit for controlling said controllable switch.

4. The device according to claim 2, wherein each of said sensor units has a non-volatile memory for storing the individual identity code.

5. The device according to claim 4, wherein said non-volatile memory stores a switching state of said controllable switch of said respective sensor unit.

6. The device according to claim 1, wherein said central control and evaluation unit transmits a reset signal over said data bus to said sensor units, through which said sensor units performs at least one of deactivating a respective said data output and discards the individual identity code.

7. The device according to claim 1, wherein said data bus is selected from the group consisting of LIN buses, CAN buses and Flexray buses.

8. The device according to claim 1, wherein said sensors units are selected from the group consisting of ultrasound sensors, radar sensors, LIDAR sensors and image detection sensors.

9. A method for determining a sensor position of sensor units of a driver assistance system of a vehicle, which comprises the steps of:
   connecting the sensor units in series with each other and with a central control and evaluation unit for an exchange of data, with a passage of the data through a sensor unit being blocked in an initial state;
   identifying a respective sensor unit by allocation of a new individual identity code to the respective sensor unit by the central control and evaluation unit; and
   canceling a blocking of the passage of the data of an identified sensor unit to create a data connection to a next sensor unit.

10. The method according to claim 9, which further comprises allocating to a last sensor unit in the series, a new individual identity code, without canceling the blocking of the passage of data.

11. The method according to claim 9, which further comprises storing the new individual identity code in a memory device.

12. The method according to claim 9, which further comprises sending, via the central control and evaluation unit, a reset signal to the sensor units through which the sensor units are made to perform one of deactivate a respective data output and to discard the individual identity code.

* * * * *